(12) United States Patent
Horinouchi et al.

(10) Patent No.: US 7,324,454 B2
(45) Date of Patent: Jan. 29, 2008

(54) ROUTER

(75) Inventors: Yoshiaki Horinouchi, Yokohama (JP);
Hiroshi Yamada, Yokohama (JP);
Hironori Ochiai, Yokohama (JP);
Takashi Yamamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 11/014,319

(22) Filed: Dec. 16, 2004

(65) Prior Publication Data

US 2005/0135363 A1  Jun. 23, 2005

(30) Foreign Application Priority Data

Dec. 19, 2003  (JP)  ............... 2003-422968

(51) Int. Cl.
*H04J 1/16* (2006.01)
*H04J 3/14* (2006.01)

(52) U.S. Cl. ...................... 370/242; 370/244

(58) Field of Classification Search ............ 370/240, 370/242, 243, 244, 245, 248, 249, 250, 252
See application file for complete search history.

(56) References Cited

U.S. PATENT DOCUMENTS

| | | | |
|---|---|---|---|
| 5,446,734 A * | 8/1995 | Goldstein | 370/397 |
| 5,748,626 A * | 5/1998 | Esaki et al. | 370/355 |
| 6,034,948 A | 3/2000 | Nakamura et al. | |
| 2002/0122426 A1* | 9/2002 | Lindquist et al. | 370/395.1 |
| 2006/0126500 A1* | 6/2006 | Wakai et al. | 370/218 |

FOREIGN PATENT DOCUMENTS

JP     9-200209     7/1997

* cited by examiner

*Primary Examiner*—Ajit Patel
(74) *Attorney, Agent, or Firm*—Katten Muchin Rosenman LLP

(57) ABSTRACT

In a router supporting a packet relay function based on a routing table, and also a VPN (Virtual Private Network) function, an output port deciding portion decides an output port different from a normal output port indicated as an output port corresponding to a destination address of a communication confirming packet based on the routing table, and packet transmitter transmits the communication confirming packet through the decided output port. A communication confirming packet determining portion determines a communicating state based on a response packet for the communication confirming packet received from the destination router of the communication confirming packet returned from another router connected to the output port and relayed by its own router.

9 Claims, 11 Drawing Sheets

ROUTER

BACKGROUND OF THE INVENTION

1. Field of the Invention

The present invention relates to a router, and in particular to a router supporting a packet relay function based on a routing table, and also a VPN (Virtual Private Network) function.

Together with recent rapid developments of communication technologies, communication networks have been complicated. When a router is newly added to a communication network for example, it is required to check to see that the router does not badly influence other devices and to perform path monitoring for detecting whether or not the router brings about a problem such as a path fault.

Also, in an enterprise or the like with distributed locations in many places, VPN networks have been increasing recently where the locations are connected through the Internet network to virtually form a single network. Together with the increase of the VPN networks, provider networks or the like which render VPN connection services have been rapidly increasing. A provider edge router located on the border of the provider networks relays a communication from a user network, and transfers it into the provider network. However, it is required to confirm whether or not a communication with an opposed user can be performed by relaying the provider edge router every time e.g. a user network is newly added.

2. Description of the Related Art

FIG. 11A shows a general IP network 500, which is composed of routers 100z_1-100z_4 connected in series, and routers 100z_5 and 100z_6 branched from the router 100z_2 and connected in series.

When the router 100z_2 is newly added to the IP network 500, it is required to perform a communication test for confirming a normality of the communication between the router 100z_2 and the routers 100z_1, 100z_3, and 100z_5 connected to the router 100z_2. For this test, the following methods (1)-(3) and the like are applied:

Method (1): Although a software relay can be performed by a ping (packet internet groper) or the like transmitted from the router 100z_2, a confirmation of a hardware relay path can not be performed. Therefore, for confirming a communication of hardware relay routing setting of the router 100z_2 having a hardware relay function, it is required to check all of the paths when a partial defect occurs in the routing table due to a hardware fault or the like. Therefore, in this method (1), a communication packet 810 using the ping or the like is transmitted from the adjoining router 100z_1, to perform the communication confirmation among the routers 100z_1, 100z_2, and 100z_3.

Method (2): A communication confirming device 200 (see FIG. 11A) is connected to the router 100z_2, the communication confirming packet 810 is transmitted from the communication confirming device 200, and the communication confirmation between e.g. the routers 100z_2 and 100z_3 is performed based on a communication confirming packet (response packet) 811 for the packet 810.

Method (3): A tester is placed at each router, whereby test data addressed to a virtual network are transmitted by using the tester to confirm the relay function of the router (see e.g. patent document 1). [Patent document 1] Japanese patent application laid-open No.09-200209 (page 5, FIG. 1)

In the communication confirmation from the adjoining router by the above-mentioned method (1), a confirmation operation in consideration of the routing setting is required per routing information as an object, procedures become complicated, and the management of the communication confirmation becomes intricate.

FIG. 11B shows a network in which the routers 100z_2, 100z_3, and 100z_5 belong to a provider network 300, and the router 100z_1, and routers 100z_4 and 100z_6 respectively belong to user networks 400_1 and 400_2.

In such a network, the provider edge router 100z_2 is required to transmit a communication packet from the user network 400_1 in order to confirm the normality of the communication with the customer edge router 100z_1 located on the border of the user network 400_1.

Namely, the communication confirmation by using the ping or the like from the customer edge router 100z_1 connected to the edge router 100z_2 is required.

Furthermore, the security management of the user network 400_1 accommodating the router 100z_1 is different from that of a provider network 300 accommodating the router 100z_2. Therefore, the provider's use of the adjoining router 100z_1 on the user side raises a problem. Also, when the router 100z_1 is at a distant location, the use of the router 100z_1 raises a problem.

Furthermore, it is impossible to confirm all of the paths in the network having several tens of thousands of paths unless the communication confirming device 200 is externally connected thereto in the same way as the method (2), which leads to poor convenience and high cost.

However, in the method (2), the expensive communication confirming device 200 has to be connected, the confirmation operation by a method of considering the routing setting per routing information as an object is required in the same way as the method (1), and the management becomes complicated.

Also, in the method (3), it is required to set the tester to each of the routers respectively, and in order to apply the method to the existing network for example, it is required to connect the tester to each router. Furthermore, in the method (3), virtual network information is inputted for testing, which is for confirming the communication to the virtual network and not for performing the communication confirmation for the actually existing path.

Furthermore, in the conventional communication confirmation technology including the methods (1)-(3), the provider network 300 which provides the VPN, i.e. the provider network 300 which provides a VPN tunnel connecting the user networks 400_1 and 400_2 can not perform the communication confirmation or the like including the VPN tunnel.

SUMMARY OF THE INVENTION

It is accordingly an object of the present invention to provide a router supporting a packet relay function based on a routing table, and also a VPN function, in which a confirmation test of a communicating state of a relay function within the router in the normal relay function and the VPN function, or a confirmation test of an arrival state of a path between the router and another router in the normal relay function and the VPN function are performed without using another router to which a special function is added and a communication confirming device.

In order to achieve the above-mentioned object, a router according to the present invention comprises: a communication confirming packet generator generating a communication confirming packet addressed to a destination router; an output port deciding portion deciding an output port different from a normal output port indicated as an output port corresponding to the destination router of the communication confirming packet by a routing table; a packet transmitter transmitting the communication confirming packet through the decided output port; and a communication confirming packet determining portion determining a communicating state of a relay function of its own router or an arrival state of a path based on a response packet for the communication confirming packet received from the destination router of the communication confirming packet returned from another router connected to the output port and relayed by its own router.

FIG. 1 shows a basic principle (1) of a router 100 according to the present invention. The network configuration shown in FIG. 1 is the same as that shown in FIG. 11A, except that the router 100 according to the present invention is connected instead of the conventional router 100z_2 in FIG. 11A.

The router 100 is provided with a communication confirming packet generator 10, an output port deciding portion 11, a packet transmitter 20 and a communication confirming packet determining portion 40. FIG. 1 also shows a packet relay portion 70 for relaying a received packet based on a routing table (not shown), that is a function included in a general router.

The communication confirming packet generator 10 generates a communication confirming packet (test packet) 800 addressed to e.g. a router 100z_2 (address). The communication confirming packet 800 is used for confirming the communicating state of the relay function of the router 100 and the arrival state (continuity state) of the path between the router 100 and the destination router 100z_2.

The routing table generally shows an output port corresponding to a destination of the communication confirming packet 800.

The output port deciding portion 11 decides e.g. an output port 21, which is different from the output port corresponding to the communication confirming packet 800 given by the routing table, and notifies the output port 21 to the communication confirming packet generator 10. The communication confirming packet generator 10 provides the communication confirming packet 800 to the packet transmitter 20 to transmit the packet from the notified output port.

It is to be noted that the method of outputting the generated communication confirming packet 800 from the decided output port is not questioned in this invention. While the output port deciding portion 11 notifies the decided output port 21 to the communication confirming packet generator 10 in the above description, it is also possible that the output port deciding portion 11 notifies the decided output port 21 to e.g. the packet transmitter 20 and this packet transmitter 20 transmits the communication confirming packet 800 from the notified output port 21.

The communication confirming packet 800 is transmitted to an adjoining router 100z_1 connected through the output port. In the adjoining router 100z_1, the communication confirming packet 800 is returned to the router 100 based on the routing table of e.g. the adjoining router 100z_1. This is because the router 100 is connected on the path between the routers 100z_1 and 100z_2.

The router 100 transfers the received communication confirming packet 800 to the destination router 100z_2 by a normal routing operation, i.e. by referring to the routing table. This general transfer operation is performed by the packet relay portion 70. The destination router 100z_2 returns a response packet 801 for the communication confirming packet 800 to the router 100.

In the router 10, the communication confirming packet determining portion 40 can determine the communicating state of the relay function of the router 100 itself and the arrival state of the path between the router 100 and the destination router 100z_2 by receiving the response packet 801. When the response packet 801 is not returned for example, the communication confirming packet determining portion 40 determines an absence of communication between the router 100 and the destination router 100z_2.

Thus, it becomes possible to recognize whether or not the routing operation (communicating state of the relay function) of the router 100 is normal, and the arrival state (continuity state) of the path to the destination router 100 without using a conventional external communication confirming device.

As a result, a cost at the time of the network configuration can be reduced. Also, since the communication confirming device and the operation of confirming the communication from the adjoining router become unnecessary, convenience is improved.

It is to be noted that the other routers except the router 100 may be conventional routers.

Also, in the above-mentioned invention, the communication confirming packet generator may generate the communication confirming packet set to head for the destination router through its own router.

Namely, the communication confirming packet generator designates its own router (original router/source router) as a transfer destination by using e.g. a source routing function or the like, and sets the communication confirming packet to head for the destination router through the original router.

Thus, even when a path not through the router 100 exists between the router 100z_1 and the destination router 100z_2, for example, the communication confirming packet is reliably transferred to the destination router 100z_2 through the router 100.

Also, in the above-mentioned invention, the communication confirming packet may further include a transfer hop number, the router may further comprise: a hop number setter setting the transfer hop number to a predetermined value, and the communication confirming packet determining portion may determine the communicating state of the relay function based on a completion (expiration) notifying packet returned when a difference between the transfer hop number and the predetermined value is null, or on an absence of a completion notifying packet returned.

Namely, the communication confirming packet 800 (see FIG. 1) can include a transfer hop number. Generally, the router transfers the communication confirming packet 800 to the subsequent router after decrements the hop number by "1". In a case where the communication confirming packet 800 does not reach the destination router even when the hop number becomes "0", the router returns a completion notifying packet 801 indicating that the transfer hop number has been completed.

The completion notifying packet 801 also enables the communication confirming packet determining portion 40 to confirm the communicating state of the relay function of the original router. Also, by thus limiting the hop number of the communication confirming packets 800, it becomes possible to reduce a network load required for the communication confirmation.

Also, in the above-mentioned invention, the communication confirming packet generator may generate the communication confirming packet having a VPN local address as a destination, the router may further comprise: an output VPN port deciding portion deciding an output port corresponding to a VPN different from an output port corresponding to the VPN local address of the destination of the communication confirming packet given by a VPN management table and the routing table.

FIG. 2 shows a basic principle (2) of the router 100 according to the present invention. The network configuration shown in FIG. 2 is different from that shown in FIG. 1 in that the router 100z_1 belongs to a user network 400_1, the routers 100, 100z_2-100z_5 belong to a provider network 300, and a user network 400_2 including routers 100z_6 and 100_7 is added.

Also, the routers 100z_6 and 100z_7 are respectively connected to the routers 100z_3 and 100z_5, thereby connecting the provider network 300 to the user network 400_2. Accordingly, the routers 100z_2 and 100z_4 are core routers, and the other routers are edge routers. Also, the user networks 400_1 and 400_2, and the provider network 300 configure the IP network 500.

A tunnel 700 is set up for connecting the user networks 400_1 and 400_2 between the routers 100 and 100z_3 within the provider network 300. The user networks 400_1 and 400_2 configure a single VPN network.

Accordingly, it is possible to transmit/receive packets by using a private IP address within the VPN, i.e. within the user networks 400_1 and 400_2.

While the router 100 has the same arrangement as that shown in FIG. 1, each functional portion supports a general VPN. For example, the router 100 is provided with e.g. an output VPN port deciding portion 13 instead of the output port deciding portion 11, and a general VPN management table (not shown).

The communication confirming packet generator 10 also supports the VPN, and generates the communication confirming packet 800 having a VPN local address of e.g. the router 100z_6 as a destination. The output VPN port deciding portion 13 retrieves an output port corresponding to the VPN local address of the communication confirming packet 800 by referring to the VPN management table and the routing table, decides an output port corresponding to the VPN, different from the retrieved output port to be notified to the communication confirming packet generator 10. The communication confirming packet generator 10 requests the packet transmitter 20 to output the communication confirming packet 800 to the notified output port. The packet transmitter 20 transmits the communication confirming packet 800 to the designated output port.

Hereafter, the same operation as the basic principle (1) is performed. It becomes possible for the router 100 to confirm the communicating state of the relay function and the communicating state of the VPN path for VPN local (address) path information of its own router.

Thus, it becomes possible to recognize whether or not the routing operation (communicating state of the relay function) of the router 100 is normal, and the arrival state (continuity state) of the path to the destination router 100 without using the conventional external communication confirming device.

Also, it becomes possible to confirm the communicating state with the VPN from e.g. the provider network and to improve the convenience of the communication and the arrival state test.

Also, the above-mentioned invention may further comprise a path extractor extracting overall-path information which confirms a communication based on the routing table to be provided to the communication confirming packet generator, and the communication confirming packet generator may generate a communication confirming packet based on the overall-path information extracted.

Namely, a path extractor extracts addresses of all of the destination routers whose communication is to be confirmed, for example, by referring to the routing table. The communication confirming packet generator generates the communication confirming packets addressed to the extracted routers. The output port deciding portion decides the output ports of the communication confirming packets generated.

Thus, it becomes possible to confirm the communicating states of the relay function and also the arrival states of all of the paths, with respect to all of the paths held by the original router.

Also, the above-mentioned invention may further comprise a local path extractor extracting overall-VPN local path information which confirms a communication based on the routing table and the VPN management table to be provided to the communication confirming packet generator, and the communication confirming packet generator may generate a communication confirming packet based on the VPN local path information extracted.

Namely, a local path extractor extracts e.g. all of the VPN local addresses (path information) whose communication is to be confirmed by referring to the routing table and the VPN management table. The communication confirming packet generator generates the communication confirming packets addressed to the VPN local addresses extracted. The output port deciding portion decides the output ports of the communication confirming packets generated.

Thus, it becomes possible for the router 100 to confirm the communicating states of the relay function and also the arrival states of the VPN path for the overall-VPN local (address) path information of its own router.

Furthermore, the above-mentioned invention may further comprise a network monitor instructing the path extractor or the local path extractor to extract overall-path information or overall-VPN local path information per a predetermined time interval.

Namely, a network monitor instructs the path extractor to extract overall-path information, or instructs the local path extractor to extract overall-VPN local path information per a predetermined time interval.

Thus, it becomes possible to monitor the arrival states of all of the paths within the network and the arrival state of the path to the VPN periodically. Together with this monitor, it becomes possible to perform an early support by the existing technology such as a path detour, when an abnormal communicating state of the network is detected, so that the reliability of the network is improved.

Furthermore, in order to achieve the above-mentioned object, a router according to the present invention may comprise: a communication confirming packet generator generating a communication confirming packet set to head for a destination router through its own router; a packet transmitter transmitting the communication confirming packet to an output port decided based on a routing table or a VPN management table; and a communication confirming packet determining portion determining a communicating state of a relay function of its own router or an arrival state of a path based on a response packet or a completion notifying packet received from the destination router for the communication confirming packet returned from another router connected to the output port and relayed by its own router.

Namely, the packet transmitter generates the communication confirming packet set to return to the original router, and to head for the destination router through the original router. The packet transmitter, different from the above-mentioned present invention, transmits a communication confirming packet to a normal output port corresponding to the destination router of the communication confirming packet given by the routing table or the VPN management table.

From another router having received the communication confirming packet, the communication confirming packet returns to the original router, which transfers the communication confirming packet to the destination router by a normal routing.

The destination router or a router whose TTL has expired respectively return a response packet for the communication confirming packet or a completion notifying packet to the original router.

Thus, while there is a possibility of limiting test contents, the confirmation test of the communicating state of the relay function within the original router in the normal packet relay function and the VPN function, or the confirmation test of the arrival state of the path between the original router and another router in the normal packet relay function and the VPN function can be performed without using other routers and the communication confirming device.

As described above, according to the router of the present invention, it becomes possible to confirm a communicating state (communicating state by relay routing setting) of a relay function in the original router by using a communication confirming packet transmitted by the original router based on path (routing) information accommodated in the original router, it becomes unnecessary to place an external communication confirming tester, and it becomes possible to greatly reduce costs.

Also, it becomes possible to confirm the communication of all of the paths regardless of the number of paths, convenience of test is improved and no security issue on the user side occurs.

Also, it becomes possible to confirm the communication of all of the paths between the user networks from the router accommodated by the provider side upon VPN construction, before users' communication. Also, it becomes possible to perform an autonomous monitoring of the communicating state of the relay function in the original router and also state monitoring (arrival state of all of the paths) of the network, and the convenience in the network management is greatly improved.

Furthermore, it is not always required to transmit a traffic (communication confirming packet, response packet or the like) for testing from end to end in the method of autonomous monitoring of the communicating state of the relay function in the original router, thereby enabling a network load for monitoring to be greatly reduced.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
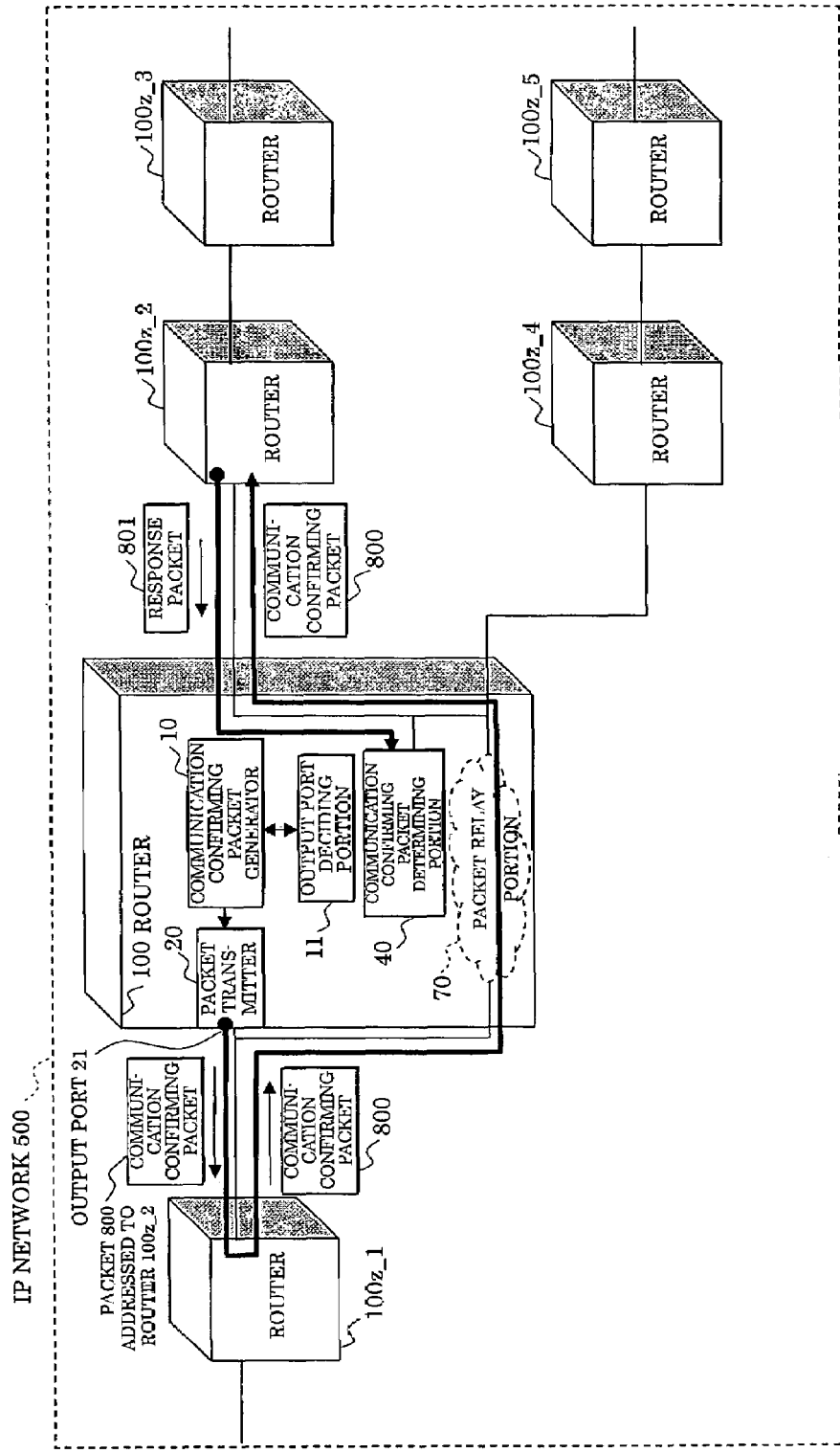
FIG. 1 is a block diagram showing an operation principle (1) of a router according to the present invention.
Figure 2:
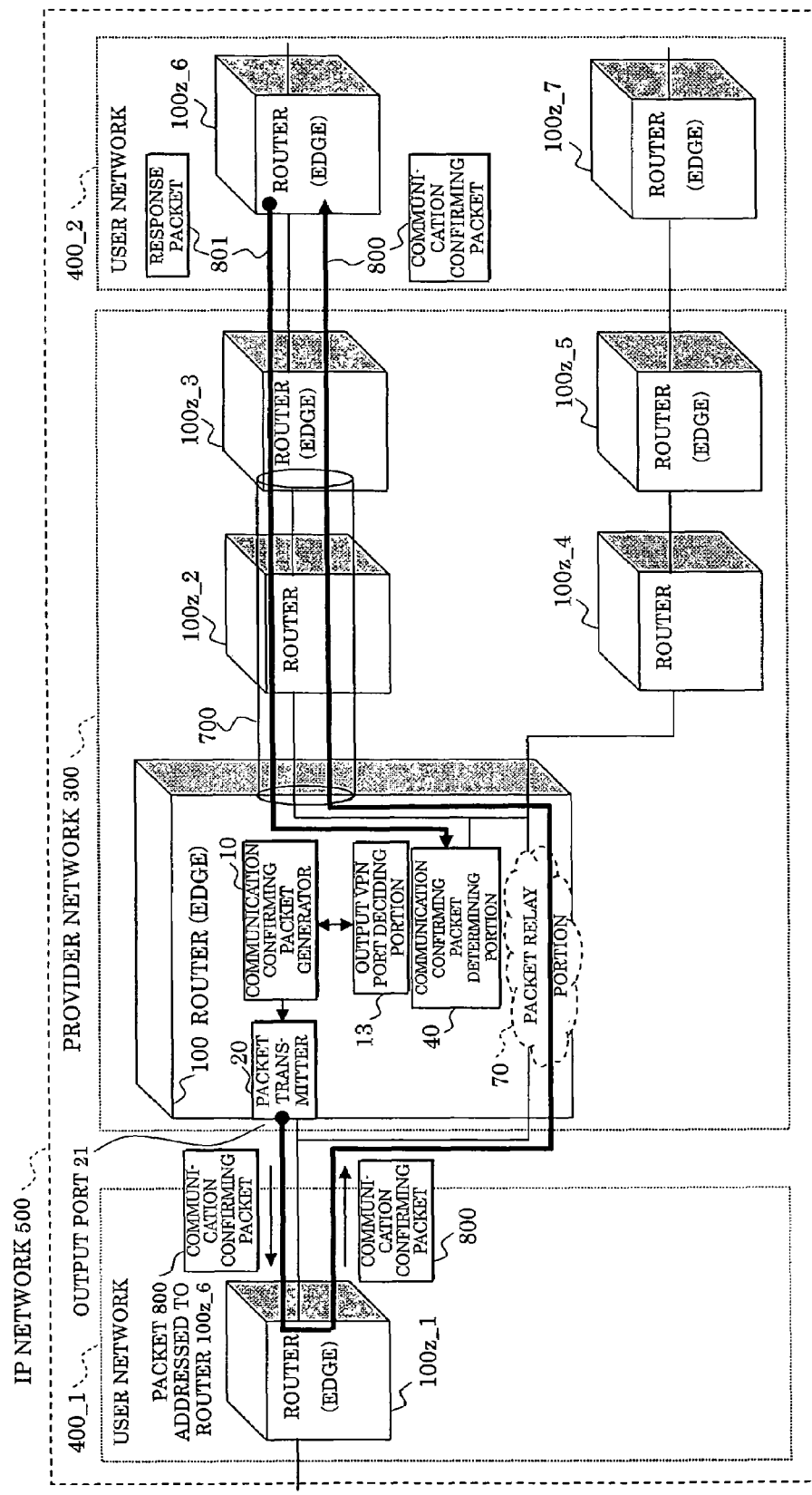
FIG. 2 is a block diagram showing an operation principle (2) of a router according to the present invention.
Figure 3:
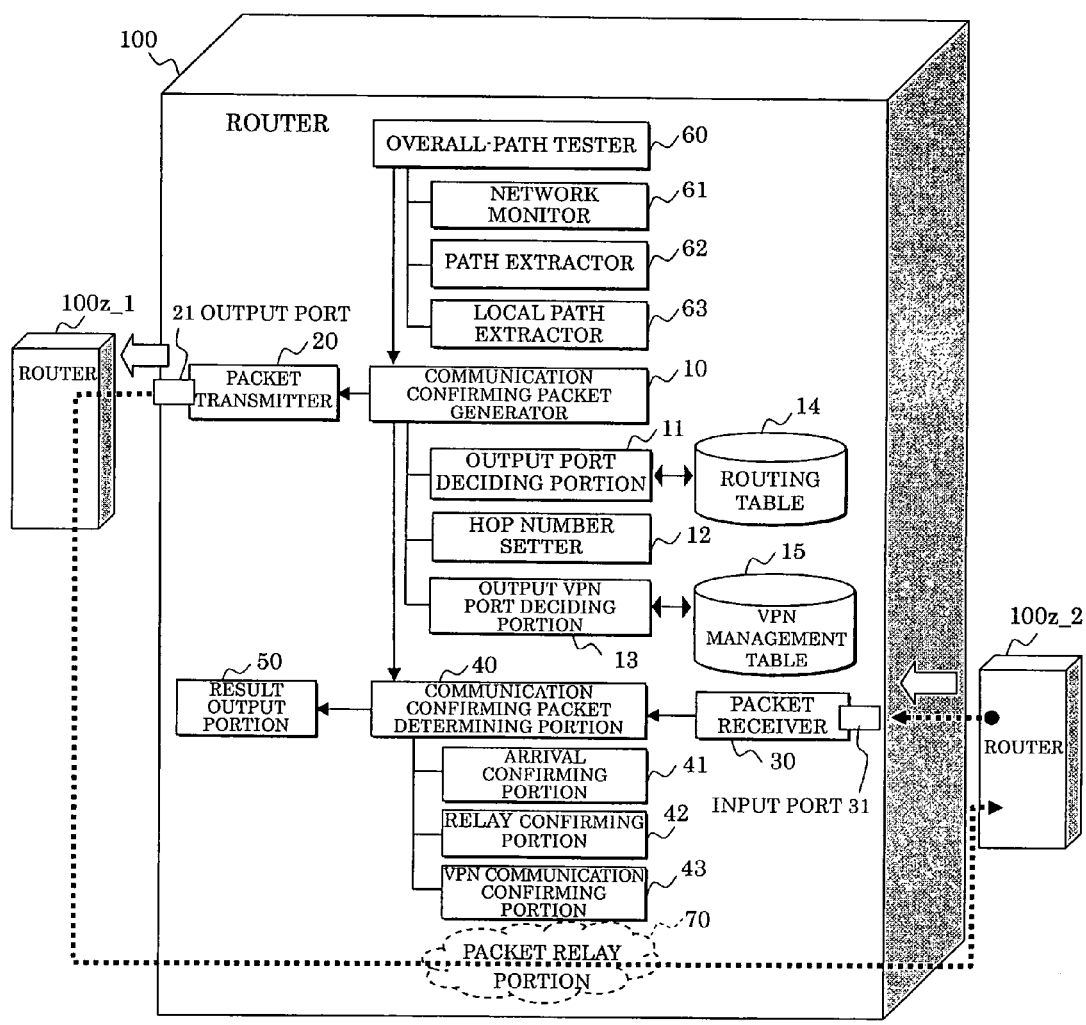
FIG. 3 is a block diagram showing an embodiment of an arrangement of a router according to the present invention.

FIG. 3 shows an embodiment of an arrangement of the router 100 according to the present invention. This router 100 is composed of the communication confirming packet generator 10, the output port deciding portion 11, a hop number setter 12, the output VPN port deciding portion 13, a routing table 14, a VPN management table 15, the packet transmitter 20, a packet receiver 30, the communication confirming packet determining portion 40, an arrival confirming portion 41, a relay confirming portion 42, a VPN communication confirming portion 43, an overall-path tester 60, a network monitor 61, a path extractor 62, a local path extractor 63 and the packet relay portion 70.

Also, the output port 21 and an input port 31 are respectively connected to the packet transmitter 20 and the packet receiver 30.

Hereinafter, the functions of these components will be described.

Communication confirming packet generator 10: The communication confirming packet generator 10 generates the communication confirming packet (testing packet) 800 used for confirming a communicating state of a relay function of the router 100 itself and an arrival (continuity) state of a path set up dynamically or statically.

Output port deciding portion 11: The output port deciding portion 11 decides an output port different from an output port corresponding to the destination of the communication confirming packet 800 given by the routing table 14 as the output port for transmitting the communication confirming packet 800.

Hop number setter 12: The hop number setter 12 changes a transfer stage number (hop number) at the time of transmitting the communication confirming packet 800 from the router 100. When the continuity state to e.g. the adjoining router is examined in a normal path, the hop number is assumed to be "3". Also, with respect to a local path in a VPN network, the hop number="x+3" obtained by adding "3" to the hop number="x" up to the provider edge router accommodating a user router which accommodates a local address (=private address used within the VPN) is set.

Output VPN port deciding portion 13: The output VPN port deciding portion 13 decides the same VPN port directly accommodated by the router 100 as an output port when the destination of the communication confirming packet 800 is the local address of the VPN with respect to the output port for transmitting the communication confirming packet 800 from the router 100.

Routing table 14 and VPN management table 15: The routing table 14 and the VPN management table 15 are general tables indicating packet transfer destinations.

Packet transmitter 20: The packet transmitter 20 transmits the communication confirming packet 800 through the output port decided by the output port deciding portion 11 or the output VPN port deciding portion 13.

Packet receiver 30: The packet receiver 30 receives the response packet 801 for the communication confirming packet 800 transmitted from the router 100 or the completion notifying packet 802 returned at the time of the TTL expiration through the input port.

Communication confirming packet determining portion 40: The communication confirming packet determining portion 40 determines whether or not the communicating state of the relay function of the router 100 and the arrival (continuity) state of the path based on the communication confirming packet 800, the completion notifying packet 802 or the like.

Arrival confirming portion 41: The arrival confirming portion 41 confirms whether or not the destination address of the communication confirming packet 800 transmitted from the router 100 coincides with the source address of the response packet 801 for the communication confirming packet 800, and determines that the communication confirming packet 800 has arrived at the destination when the destination address coincides with the source address.

Relay confirming portion 42: The relay confirming portion 42 confirms that the source address of the completion notifying packet (packet returned by an ICMP function (TTL expired) included in the prior art router) 802 indicating the hop number completion returned for the communication confirming packet 800 transmitted from the router 100 is a gateway address for a confirmed path.

VPN communication confirming portion 43: The VPN communication confirming portion 43 confirms whether or not the source address of the completion notifying packet 802 indicating the hop number completion returned for the communication confirming packet 800 transmitted to a local address from the router 100 is an address of a customer router accommodating a confirming object local address.

Overall-path tester 60: The overall-path tester 60 performs a confirming test of the arrival state of all of the paths or a predetermined path included in the path information (routing table 14) held by the router 100.

Network monitor 61: The network monitor 61 performs the confirmation of the arrival state of all of the paths or a predetermined path periodically at the router 100 to manage the confirmation result.

Path extractor 62: The path extractor 62 extracts overall-path information or predetermined path information held by the routing table 14.

Local path extractor 63: The local path extractor 63 extracts overall-local path (path of local address) information or a predetermined local path held by the routing table 14 and the VPN management table 15.

Packet relay portion 70: The packet relay portion 70 is a packet relay portion included in a general router, which transfers the packet received from the input port (including the input port 31 shown in FIG. 3) through the output port (including the output port 21 shown in FIG. 3) decided based on the routing table 14 (routing table 14 and VPN management table 15 in case of VPN).

Hereinafter, embodiments (1)-(6) examining or monitoring the communicating state of the relay function of the router 100 itself and the arrival state of the path to other routers will be described referring to FIGS. 4-10. In the embodiments (1)-(6), it is required to mount only a part of the above-mentioned functions, and is not required to mount all of the functions.

Embodiment (1)

Figure 4:
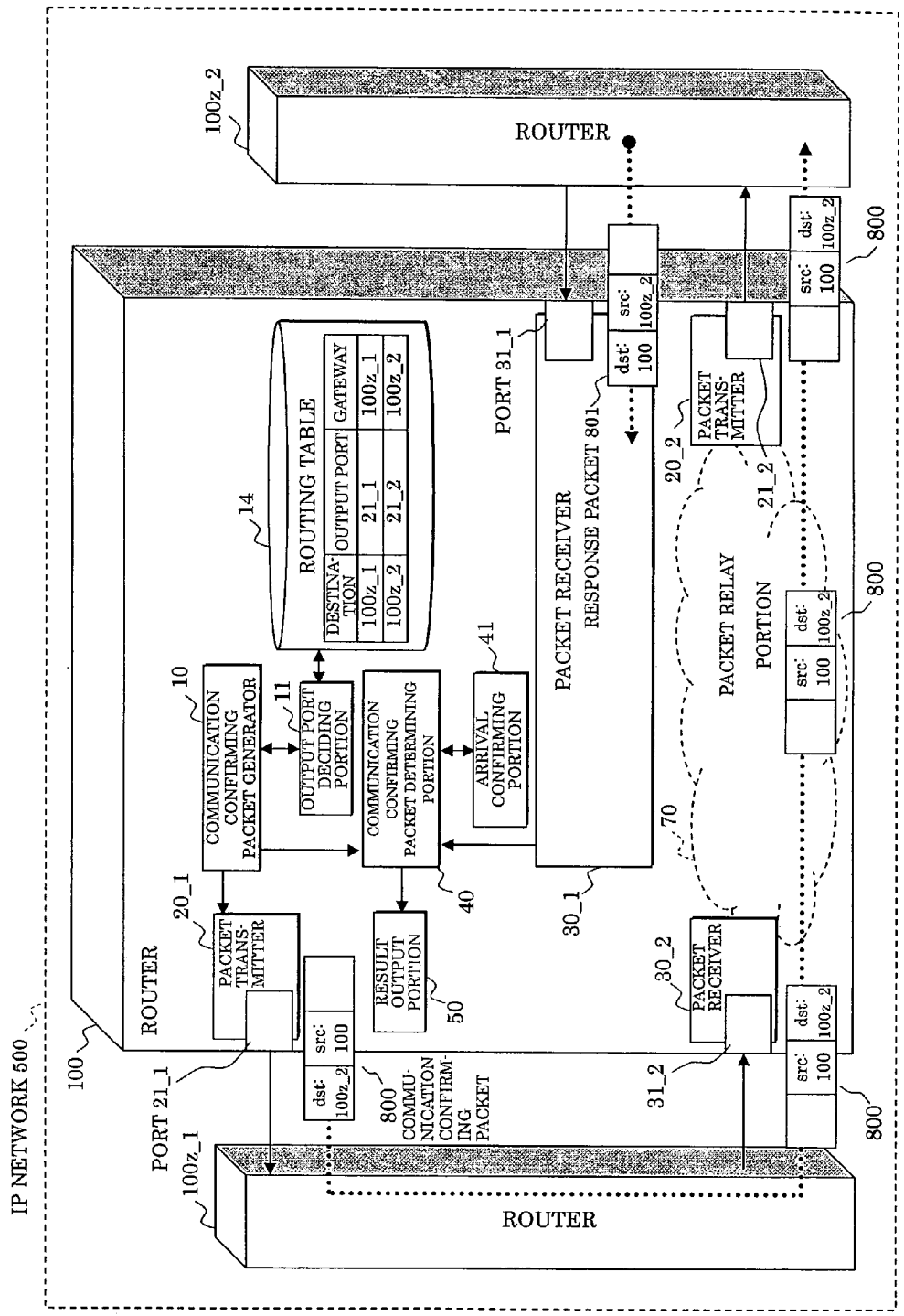
FIG. 4 is a block diagram showing an embodiment (1) of a router according to the present invention.

FIG. 4 shows an embodiment (1) of the router 100 according to the present invention. In FIG. 4, only the routers 100z_1, 100 and 100z_2 connected in series which are a part of the IP network are shown.

The router 100 is composed of the communication confirming packet generator 10, the output port deciding portion 11, the routing table 14, packet transmitters 20_1 and 20_2, packet receivers 30_1 and 30_2, the communication confirming packet determining portion 40, the arrival confirming portion 41, the relay confirming portion 42, and the packet relay portion 70. The packet transmitters 20_1 and 20_2, and the packet receivers 30_1 and 30_2 are respectively connected to output ports 21_1 and 21_2, and input ports 31_1 and 31_2.

The routers 100z_1 and 100z_2 are respectively connected to the ports 21_1 and 31_2, and the ports 21_2 and 31_1.

The relay function of the router 100 is made the communicating state automatically set by the routing protocol such as RIP (Routing Information Protocol) and OSPF (Open Shortest Path First) or fixedly (statically) set by a command or the like. The router 100 confirms the communicating state of the relay function by using the communication confirming packet 800 transmitted from its own router. The packet 800 is generated by the communication confirming packet generator 10 by using a ping that is a general function of the ICMP (Internet Control Message Protocol).

A confirming operation of the communicating state of the relay function will now be described.

In the router 100, the packet communication confirming packet generator 10 generates the communication confirming packet 800 for confirming the communicating state between the router 100 and the router 100z_2. Furthermore, the packet generator 10 notifies the address of the router 100z_2 which is the destination of the communication confirming packet 800 to the output port deciding portion 11.

The output port deciding portion 11 decides the output port 21_2 to which the packet 800 is transferred upon a normal routing processing by referring to the routing table 14 with the address of the destination router 100z_2 as a key, and extracts the output port 21_1 except the port 21_2 to be notified to the communication confirming packet generator 10. The communication confirming packet generator 10 designates the router 100 as a transferring destination by using a source routing function (function of designating route of the transfer packet with ping) or the like in order for the communication confirming packet 800 to pass through the router 100, and provides the packet 800 to the packet transmitter 20_1 connected to the port 21_1.

The packet transmitter 20_1 transmits the communication confirming packet 800 through the port 21_1. The communication confirming packet 800 is transferred to the router 100z_1, and is further returned to the router 100 from the router 100z_1.

In the router 100, the communication confirming packet 800 is provided to the packet relay portion 70 through the port 31_2, and the packet receiver 30_2.

The packet relay portion 70 retrieves the "port 21_2" corresponding to the address of the "router 100z_2" which is a destination of the packet 800 by referring to the routing table 14. Then, the packet relay portion 70 transfers the packet 800 to the router 100z_2 through the packet transmitter 20_2 and the port 21_2.

The router 100_2 returns to the router 100 the response packet 801 for the communication confirming packet 800 addressed to the router 100_2.

In the router 100, the response packet 801 is provided to the arrival confirming portion 41 through the input port 31_1, the packet receiver 30_1, and the communication confirming packet determining portion 40. The arrival confirming portion 41 performs comparison processing of the designated destination address (address of the router 100z_2) and the source address of the response packet 801 upon transmitting the communication confirming packet 800, confirms that the addresses coincide with each other, and notifies the comparison result to the communication confirming packet determining portion 40.

The communication confirming packet determining portion 40 determines that the communication confirming packet 800 has arrived at the router 100z_2 through the router 100 based on the comparison result from the arrival confirming portion 41. The communication confirming packet determining portion 40 notifies the determination result to the result output portion 50, which displays the communication confirming result to a maintenance person by a CLI (Command Line Interface) or the like.

Thus, it becomes possible to confirm the communicating state of the relay function (routing function) of the router 100 and the arrival (continuity) state of the path to the router 100z_2 through the router 100z_1.

Thus, the router 100 according to the present invention can confirm the communicating state of the relay function of the router 100 dynamically or statically set and the arrival state of the path to the object router 100z_2 by the communication confirming packet 800 transmitted by the router 100.

Embodiment (2)

Figure 5:
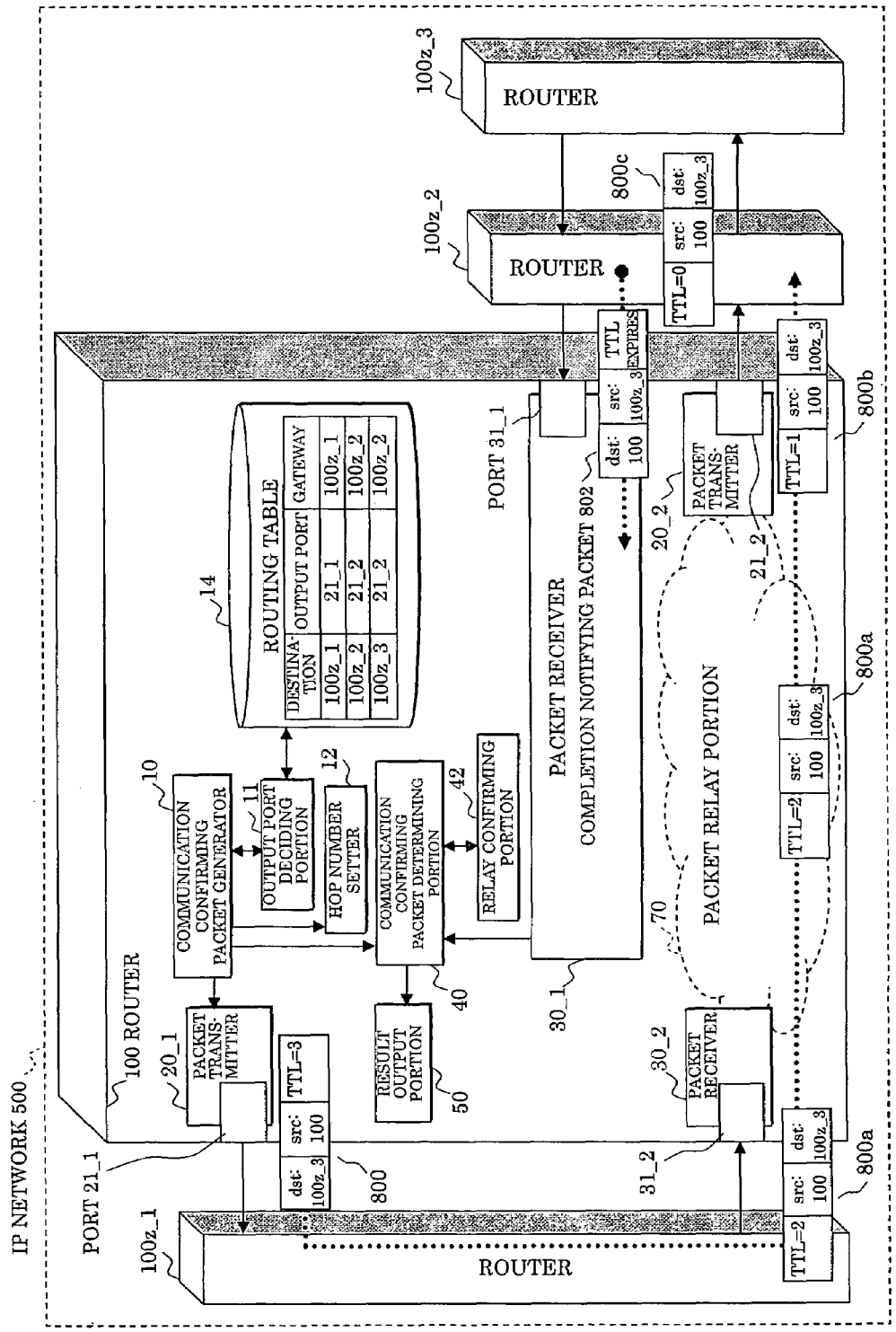
FIG. 5 is a block diagram showing an embodiment (2) of a router according to the present invention.

FIG. 5 shows the embodiment (2) of the router 100 according to the present invention. This router 100 is different from that of the embodiment (1) shown in FIG. 4 in that the relay confirming portion 42 is substituted for the arrival confirming portion 41, the hop number setter 12 is added, and the router 100z_3 is further connected to the router 100z_2 in series to compose the IP network 500.

In the IP network 500, the router 100 confirms the communicating state of the relay function dynamically or statically set and the arrival state of the path in the same way as the embodiment (1). However, different from the embodiment (1), the confirmation is performed by using the communication confirming packet 800 including the hop number transmitted by the router 100.

Hereinafter, this confirmation operation will be described.

In the router 100, the communication confirming packet generator 10 generates the communication confirming packet 800 addressed to the router 100z_3 by using e.g. the ping for the communication confirmation in the same way as the embodiment (1). At this time, the output port deciding portion 11 retrieves the output port 21_2 in a routing direction by referring to the routing table 14 with the address information of the destination router 100z_3 as a key, further searches the routing table 14 from the top, decides the other output port 21_1 different from the output port 21_2, and provides the decision result to the communication confirming packet generator 10.

After setting the transfer hop number (=TTL) of the communication confirming packet 800_1 to "3" by the hop number setter 12, the communication confirming packet generator 10 designates the router 100 as a transfer destination by using the source routing function or the like so that the packet 800 may pass through the router 100. The communication confirming packet generator 10 provides the communication confirming packet 800 to the packet transmitter 20_1.

The packet transmitter 20_1 transmits the packet 800 to the router 100z_1 through the port 21_1.

The router 100z_1 returns a packet 800a whose TTL="2" obtained by decrementing the TTL="3" of the received packet 800 by "1".

In the router 100, the packet relay portion 70 transfers a packet 800b whose TTL="1" obtained by decrementing the TTL="2" of the communication confirming packet 800a by "1" to the router 100z_2 through the packet transmitter 20_2 and the output port 21_2 by referring to the routing table 14.

In the router 100z_2, the packet relay portion 70 (not shown) decrements the TTL="1" of the communication confirming packet 800b by "1", and obtains the TTL="0", thereby determining that the TTL of the packet 800b has expired and discarding the packet 800b instead of preparing a packet 800c of the TTL="0" to be transferred to the router 100z_3.

The router 100z_2 prepares the completion notifying packet 802 (TTL completion notifying packet which is a general function of ICMP) indicating that the TTL has expired (hop number has been completed) of the packet 800b and returns the packet 802 to the router 100.

In the router 100, the completion notifying packet 802 is provided to the communication confirming packet determining portion 40 through the port 31_1 and the packet receiver 30_1. The communication confirming packet determining portion 40 provides the source address (address of the router 100z_2) of the completion notifying packet 802 to the relay confirming portion 42.

The relay confirming portion 42 confirms that the source address of the packet 802 is the address of the router 100z_2 existing on the path to the destination address (address of the router 100z_3) of the communication confirming packet 800 from the router 100. Namely, the relay confirming portion 42 confirms that the source address of the packet 802 is the gateway address (address of the router 100z_2) when the normal routing processing is performed. The relay confirming portion 42 notifies the confirmation result to the communication confirming packet determining portion 40.

The communication confirming packet determining portion 40 determines that the hop number has been completed in the router 100z_2 on the path on which the communication confirming packet 800 heads for the router 100z_3. The determining portion 40 notifies the determination result to the result output portion 50, which displays the communicating state confirmation and the arrival state result to the maintenance person by the CLI or the like.

Thus, by transmitting the communication confirming packet 800 from the router 100, the communicating state of the relay function can be confirmed based on the path information of its own router. Furthermore, by the completion notifying packet 802 returned from the router on the path decided by the hop number set to the TTL of the communication confirming packet 800, the arrival state of the path between the router 100 and the router on the path can be confirmed.

Embodiment (3)

Figure 6:
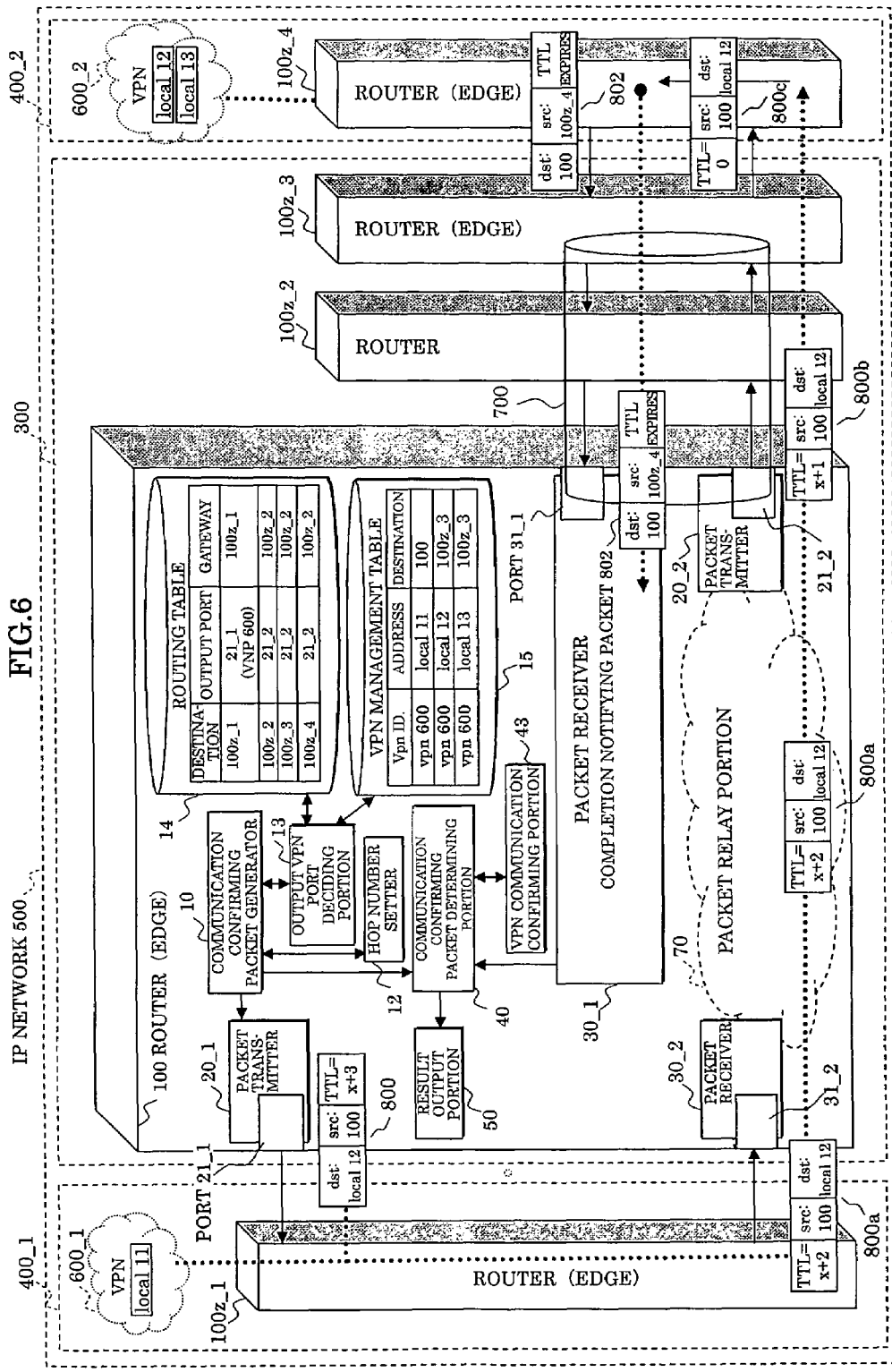
FIG. 6 is a block diagram showing an embodiment (3) of a router according to the present invention.

FIG. 6 shows the embodiment (3) of the router 100 according to the present invention. In the embodiment (3), the customer router 100z_1 in the embodiment (2) shown in FIG. 5 belongs to the user network 400_1, and the edge router 100, the core router 100z_2, and the edge router 100z_3 belong to the provider network 300. Furthermore, the user network 400_2 including the customer router 100z_4 is added, the router 100z_3 is connected to the router 100z_4 and interconnects the provider network 300 and the user network 400_2.

A VPN network 600_1 including the router 100z_1 and a VPN network 600_2 including the router 100z_4 are respectively configured in the user networks 400_1 and 400_2.

The tunnel 700 for connecting the user network 400_1 to the user network 400_2 is set up between the routers 100 and 100z_3 within the provider network 300.

Thus, the VPN networks 600_1 and 600_2 configure a single VPN network 600. Accordingly, the transmission/reception can be performed by using a private IP address in the VPN network 600.

While the router 100 has the same arrangement as the router 100 shown in FIG. 5, it is further provided with a VPN management table 15 and each functional portion supports a general VPN. Also, the router 100 is provided with the output VPN port deciding portion instead of the output port deciding portion 11.

In the embodiment (3), the confirmation test of the communicating state of the relay function of the edge router 100 itself in the provider network 300 and a confirmation test of the arrival state of another path to the router 100 in the VPN network 600 are performed. Hereinafter, an operational example of the test using the communication confirming packet 800 from the router 100 will be described.

In the router 100, the communication confirming packet generator 10 generates the communication confirming packet 800 addressed to a local address "local 12" by using the ping. At this time, the output VPN port deciding portion 13 extracts the VPN ID="600" from the VPN management table 15 with the destination local address "local 12" as a key, in order to extract a VPN accommodating port as an output port, and detects the output port=21_2 with the VPN ID as a key by referring to the routing table 14. The output VPN deciding portion decides the output port 21_1 (port directly accommodating the edge router 100z_1) different from the detected output port 21_2 to be notified to the generator 10.

Also, the hop number setter 12 provides to the generator 10 "x+3" obtained by adding "3" to the hop number="x" up to the edge router 100z_3 directly accommodating the customer router 100z_4 which accommodates the device whose destination local address is "local 12", as the transfer hop number of the communication confirming packet 800.

The communication confirming packet generator 10 sets TTL="x+3" to the communication confirming packet 800, and provides, to the packet transmitter 20_1 by designating the output port 21_1, the packet 800 designating the edge router 100 as the transfer destination by using the source routing function or the like so that the communication confirming packet 800 may pass through the edge router 100. The transmitter 20_1 transmits the packet 800 from the port 21_1.

The communication confirming packet 800 is transferred to the customer router 100z_1, returned to the router 100 from the router 100z_1, and is relayed to the port 21_2 from the port 31_2 in the packet relay portion 70 to be transferred heading for the edge router 100z_3.

At this time, the TTL number of the communication confirming packet 800 is decremented by "1" every time the packet passes through the router 100z_1 and router 100, and the TTL assumes "1" when the packet arrives at the edge router 100z_3.

Furthermore, the communication confirming packet 800 is transferred to the customer router 100z_4 accommodating therein the destination local address "local 12", and the TTL assumes "0" in the router 100z_4, so that the hop number is completed.

The customer router 100z_1 transmits the completion notifying packet 802 notifying the hop number completion to the source router 100 of the communication confirming packet 800.

In the edge router 100, the packet receiver 30_1 receives the packet 802, which is provided to the VPN communication confirming portion 43 through the communication confirming packet determining portion 40. The VPN communication confirming portion 43 confirms that the source address (address of the router 100z_4) of the concerned packet 802 is the customer router 100z_4 accommodating the destination local address which has been already recognized by a BGP (Border Gateway Protocol) or the like, and the confirmation result is notified to the determining portion 40.

Based on this confirmation result, the communication confirming packet determining portion 40 determines that the communication confirming packet 800 passes through the edge router 100, and the hop number has been completed at the customer router 100z_4 on the way to the destination VPN local address "local 12".

The communication confirming packet determining portion 40 notifies the determination result to the result output portion 50, which displays the communication confirming result to the maintenance person by the CLI or the like.

As mentioned above, it becomes possible for the router 100 to confirm the communicating state of the relay function for the local path information of the router 100 and the communicating state (arrival state of path) between the VPN networks 600_1 and 600_2 by using the transmitted communication confirming packet 800.

Embodiment (4)

Figure 7:
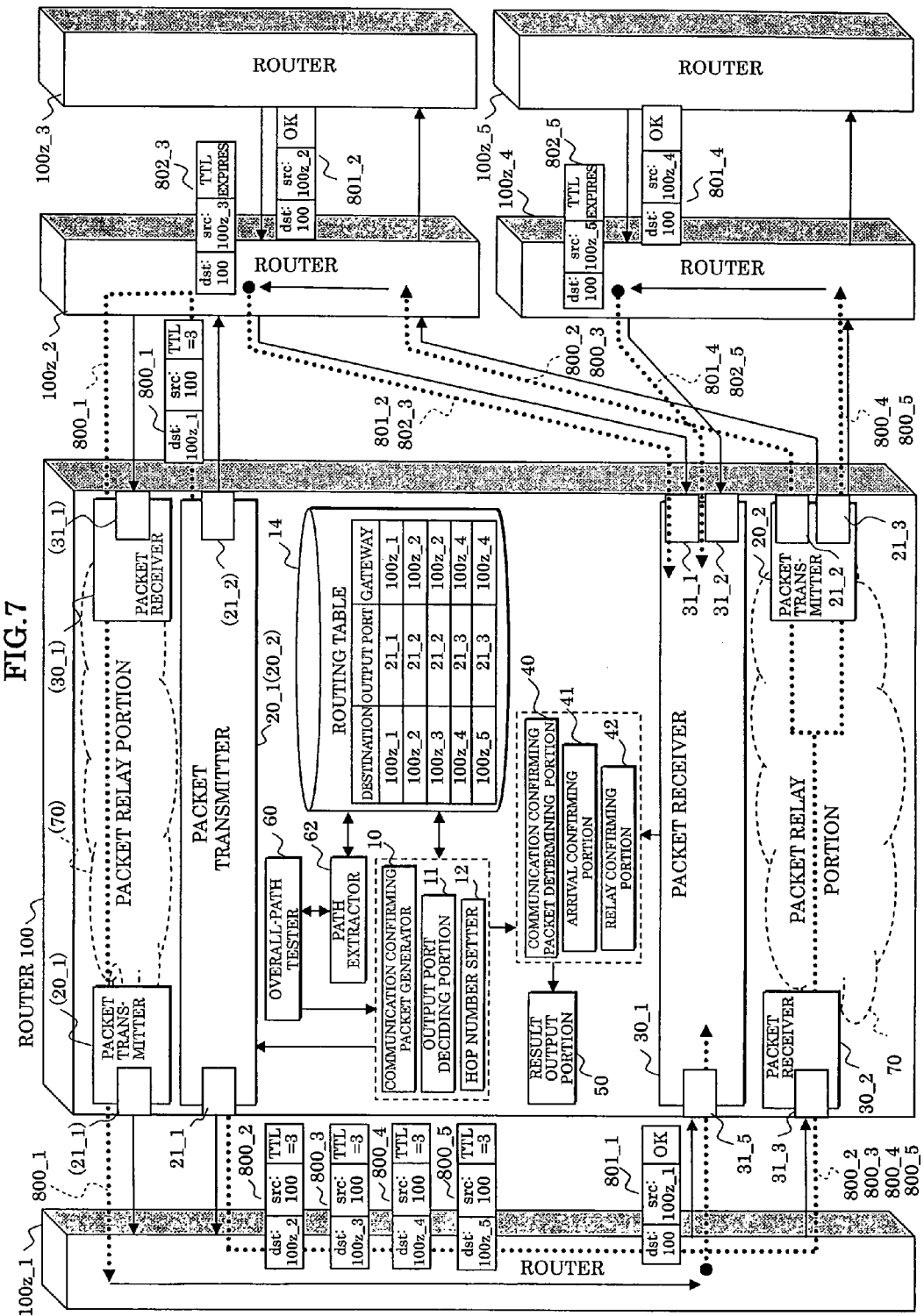
FIG. 7 is a block diagram showing an embodiment (4) of a router according to the present invention.

FIG. 7 shows the embodiment (4) of the router 100 according to the present invention. In this embodiment (4), in the IP network composed of the routers 100, and 100z_1-100z_5, the router 100 performs the confirming operation of the communicating state of the relay function of its own dynamically or statically set and the arrival state (continuity state) of all of the paths.

As for the arrangement of the router 100, the overall-path tester 60, the path extractor 62, and the arrival confirming portion 41 are added to the router 100 of the embodiment (2) shown in FIG. 5. It is to be noted that FIG. 7 shows the packet relay portion 70, the packet transmitter 20_1, the output port 21_1, the packet receiver 30_1, the input port 31_1 and the like in duplicate, in order to facilitate the understanding of the flow of the packet 800_1 for confirming the arrival state of the path between the router 100 and the router 100z_1.

Hereinafter, the operation procedure by the router 100 of confirming the communicating state of the relay function of the router 100 and the arrival state of all of the paths will be described.

In the router 100, the overall-path tester 60 requests the overall-path information from the path extractor 62. The path extractor 62 sequentially extracts all of the paths from the top of the routing table 14, and provides the overall-path information held by the router 100 (destination (dst): routers 100z_1-100z_5) to the overall-path tester 60. The overall-path tester 60 sequentially provides each path information to the communication confirming packet generator 10, and makes the confirmation request of the communicating state for each path.

Every time this confirmation request is received, the communication confirming packet generator 10 generates the communication confirming packet 800 for the requested path. On the other hand, the output port deciding portion 11 obtains the output port to transfer the packet upon normal routing process by referring to the routing table 14 with the destination address of the communication confirming packet 800 as a key, in order to extract the output port except ports in the routing direction, and decides another output port different from the output port obtained by searching the same routing table 14 from the top.

Also, the communication confirming packet generator 10 sets the transfer hop number TTL="3" obtained by the hop number setter 12 to the communication confirming packet 800, designates the router 100 as the transfer destination by using the source routing function or the like so that the communication confirming packet 800 may pass through the router 100, and then transmits the packet 800_1 from the packet transmitter 20_1.

Similarly, the packets 800_2-800_5 corresponding to other paths are transmitted.

The communication confirming packets 800_1-800_5 (hereinafter, occasionally represented by a reference numeral 800) are returned from the adjoining router, and transferred to the adjoining router on the respective path through the router 100.

At this time, the TTLs of the communication confirming packets 800_3 and 800_4 for the paths (=routers 100z_3 and 100z_5) not adjoining are respectively decremented by "1" at the router 100z_1 in the opposite direction to the routing direction, are decremented by "1" when the packets pass through their own router 100, and assume "0" when the packets arrive at the routers 100z_2 and 100z_4 in the routing direction.

Since the routers 100z_2 and 100z_3 can not transfer the communication confirming packet 800 whose TTL="0" respectively to the destination, they return the completion notifying packets 802_3-802_5 (hereinafter, occasionally represented by a reference numeral 802) indicating the hop number completion of the communication confirming packet 800 (TTL="0") to the source router 100 of the packet 800.

The adjoining routers 100z_1, 100z_2, and 100z_4 respectively return response packets 801_1, 801_2, and 801_4 for the communication packets 800_1, 800_2, and 800_4 to the source router 100 of the communication confirming packet 800.

In the router 100, the packet receiver 30_1 provides the response packet 801 or the completion notifying packet 802 received to the communication confirming packet determining portion 40. The communication confirming packet determining portion 40 performs the determination processing corresponding to the packets 801 and 802, and the arrival confirming portion 41 performs comparison processing of the designated destination address and the source address (address of e.g. the router 100z_2) of the concerned packets 801 or 802 to confirm that the addresses coincide with each other.

On the other hand, the relay confirming portion 42 determines the source address of the concerned packet 800, and confirms that it is the gateway address when the normal routing processing is performed.

The communication confirming packet determining portion 40 determines that the communication confirming packet 800 corresponding to the respective path information passes through the router 100 based on the confirmation result of the arrival confirming portion 41 and the relay confirming portion 42.

The communication confirming packet determining portion 40 notifies the determination result for all of the paths to the result output portion 50, which displays the communication confirming result to the maintenance person by the CLI or the like.

Thus, it becomes possible to confirm the communicating state of the relay function of the router 100 and the arrival state (continuity state) to the gateway router of all of the paths for the overall-path information held by the router 100 by using the packet 800 transmitted by the router 100.

It is also possible to confirm the arrival state (continuity state) to all of the routers by setting the hop number up to the corresponding router in the TTL of the communication confirming packet 800 corresponding to each path.

Embodiment (5)

Figure 8:
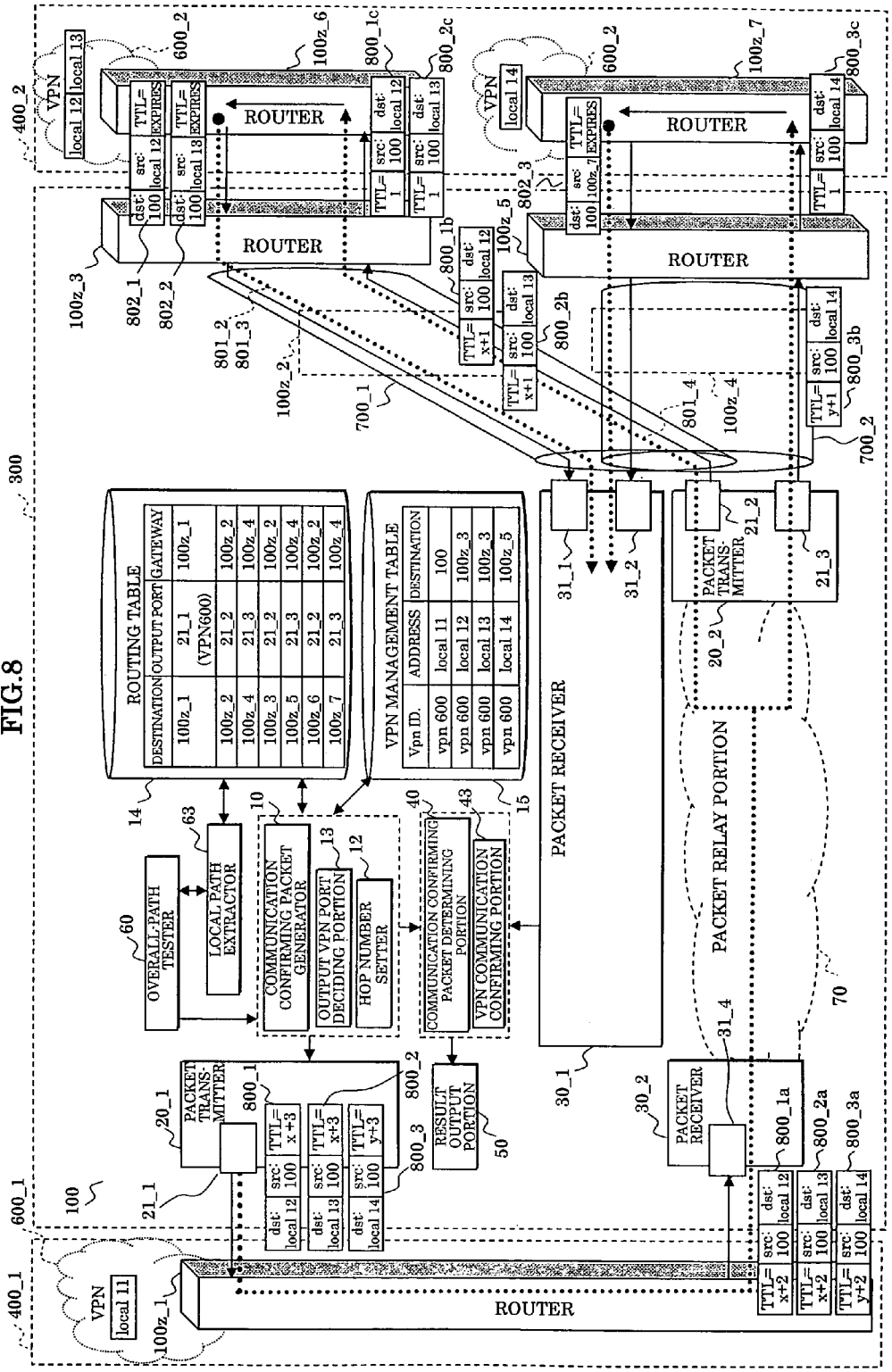
FIG. 8 is a block diagram showing an embodiment (5) of a router according to the present invention.

FIG. 8 shows the embodiment (5) of the router 100 according to the present invention. In this embodiment (5), the edge router 100 confirms the communicating state in the customer routers 100z_1, the edge router 100, the core router 100z_2, the edge router 100z_3, the core router 100z_4, the edge router 100z_5, the customer router 100z_6, and the customer router 100z_7 configuring the VPN network 600.

Namely, the edge router 100 confirms the communicating state of the relay function for all of the local paths dynamically or statically set in its own router and the communicating state between accommodating VPNs by transmitting the communication confirming packet 800.

The router 100 is different from that of the embodiment (4) shown in FIG. 7 in that the local path extractor 63 is substituted for the path extractor 62 of the embodiment (4), the output VPN port deciding portion 13 is substituted for the output port deciding portion 11, the VPN communication confirming portion 43 is substituted for the arrival confirming portion 41 and the relay confirming portion 42, and the VPN management table 15 is added.

The operation procedure example in the case where the router 100 confirms the communicating state of the relay function and the communicating state between the accommodating VPNs by transmitting the communication confirming packet 800 will now be described.

In the router 100, the overall-path tester 60 provides the instructions of extracting local paths to the local path extractor 63. The local path extractor 63 sequentially extracts all of the local addresses "local 11-local 14" held by the VPN management table 15 from the top of the VPN management table 15 to be provided to the overall-path tester 60.

Since the communication to the local path is confirmed every time a single local address is extracted, the overall-path tester 60 provides the communication confirming request including the local address to the communication confirming packet generator 10.

The communication confirming packet generator 10 generates the communication confirming packet 800 every time the communication confirming request is received. The output VPN port deciding portion 13 decides the VPN accommodating port (port directly accommodating the customer router) by referring to the VPN management table 15 and the routing table 14 with the destination local address and the VPN ID as keys, in order to extract the VPN accommodating port as an output port.

Also, the hop number setter 12 provides the values "x+3" and "y+3" obtained by adding "3" to the hop numbers "x" and "y" up to the edge routers 100z_3 and 100z_5 directly accommodating the customer routers 100z_6 and 100z_7 respectively which accommodate the destination local addresses as the transfer hop numbers of the communication confirming packets 800.

The communication confirming packet generator 10 sets these values to the TTLs of the communication confirming packets 800, then designates the edge router 100 for the transfer destination by using the source routing function or the like so that the communication confirming packets 800 may pass through the edge router 100, and requests the packet transmitter to transmit the packets 800.

The communication confirming packets 800 are transferred to the customer router 100z_1 directly accommodated by the router 100, are returned from the customer router 100z_1 to be relayed by the edge router 100, and are further transferred to the edge routers 100z_4 and 100z_5 directly accommodating the customer routers 100z_6 and 100z_7 which accommodate the local addresses.

At this time, the TTLs of the communication confirming packets 800_1-800_3 are decremented by "1" at the customer router 100z_1 of the transmitting destination, are decremented by "1" every time the packets pass through the edge router 100, and assume "1" when the packets arrive at the edge routers 100z_3 and 100z_5. At the customer routers 100z_6 and 100z_7 accommodating the local addresses of the transmitting destinations, the TTLs assume 0 and the hop numbers are completed.

It is impossible to transfer the communication confirming packets 800 whose TTLs="0" to the local address sides from the customer routers 100z_6 and 100z_7. Therefore, the customer routers 100z_6 and 100z_7 transmit the completion notifying packets 802 notifying the hop number completion to the edge router 100 which is the source of the communication confirming packets.

In the router 100, the packet receiver 30_1 provides the hop number completion notifying packets 802 received to the VPN communication confirming portion 43. This VPN communication confirming portion 43 confirms that the source addresses (addresses of the routers 100z_6 and 100z_7) of the packets 802 are the customer routers 100z_6 and 100z_7 accommodating the destination local addresses which have been preliminarily recognized by the BGP or the like.

The communication confirming packet determining portion 40 determines that the communication confirming packets 800 pass through the edge router 100 based on the confirmation result of the VPN communication confirming portion 43, and that the hop numbers have been completed at the customer routers on the way to the local addresses of the concerned VPN.

The communication confirming packet determining portion 40 notifies the determination result to the result output portion 50, which displays the communication confirming result for the maintenance person by the CLI or the like.

Thus, it becomes possible for the router 100 to confirm the communicating state of the relay function and the communicating state between the VPNs for the overall-local path information of the router 100 by using the packet 800.

Embodiment (6)

Figure 9:
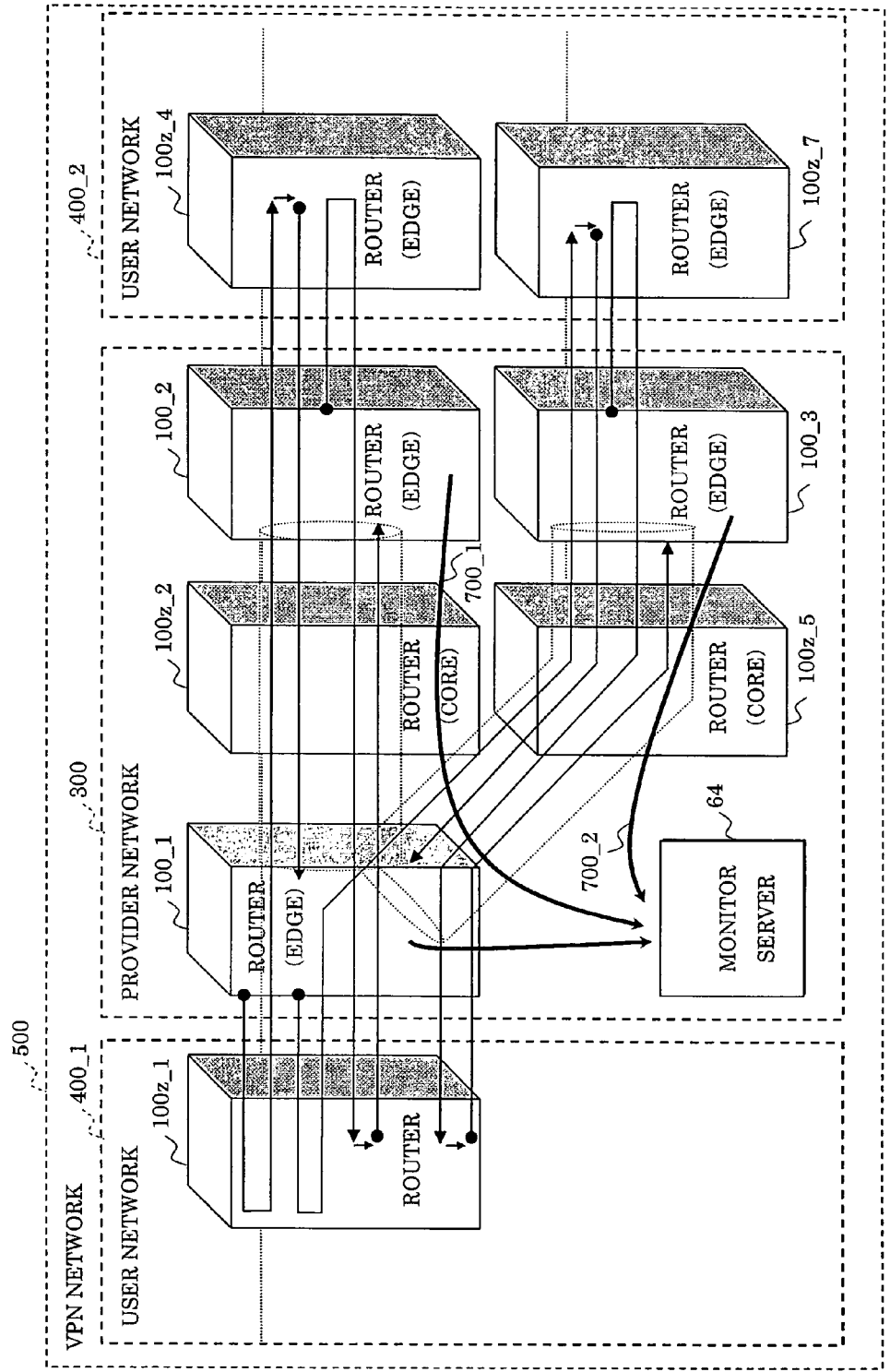
FIG. 9 is a block diagram showing a network arrangement using a router according to the present invention.

FIG. 9 shows an example of the IP network 500 using the router according to the present invention. This IP network 500 is the same as that shown in FIG. 8 except that the routers 100_2 and 100_3 of the present invention are substituted for the general routers 100z_3 and 100z_5 of the provider network 300. Also, the IP network 500 in FIG. 9 is different from that shown in FIG. 8 in that a monitor server 64 is connected to the edge routers 100_1-100_3. It is to be noted that the reference numeral of the router 100 in FIG. 8 is changed to 100_1.

Figure 10:
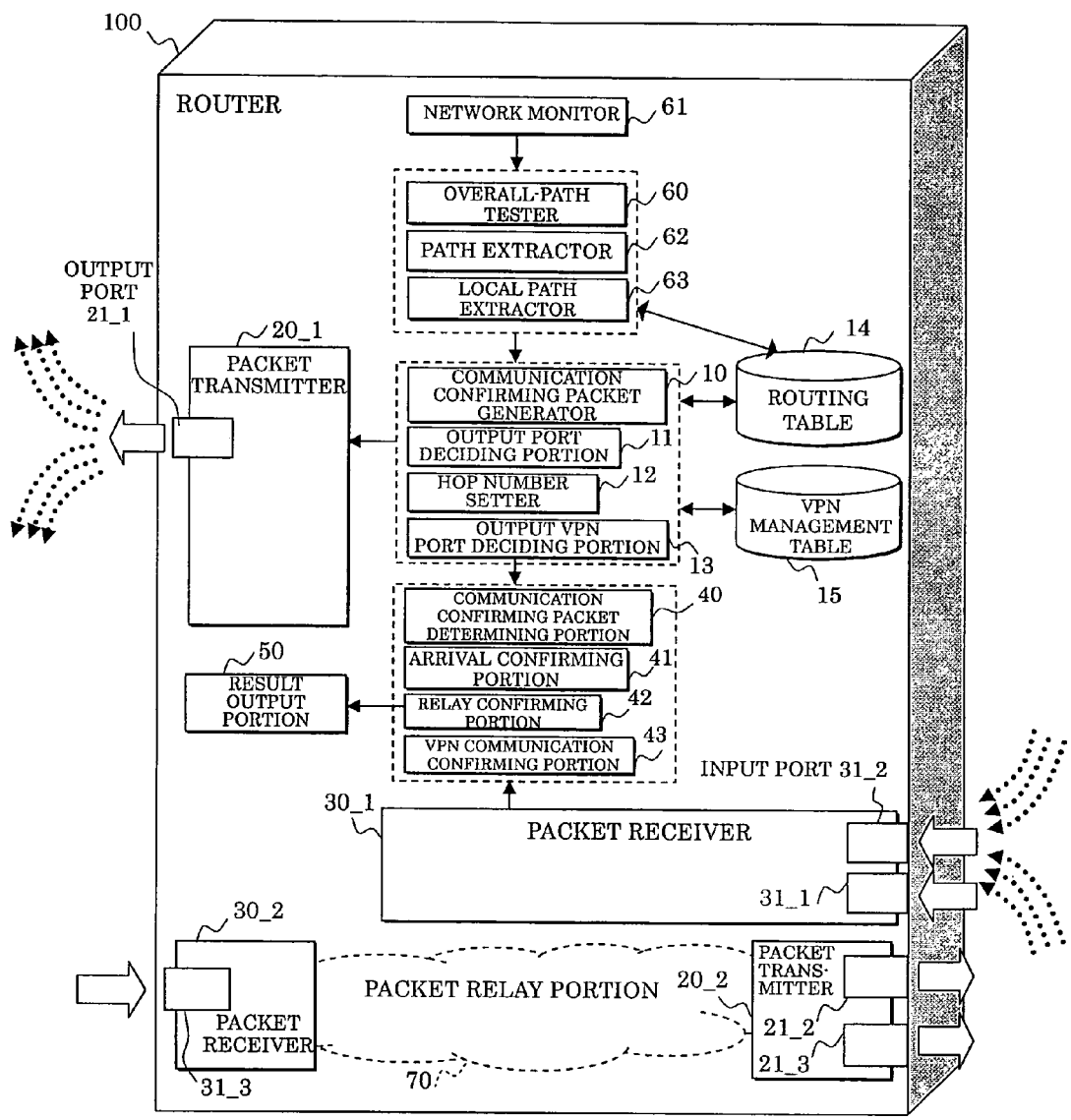
FIG. 10 is a block diagram showing an embodiment (6) of a router according to the present invention.
Figure 11A:
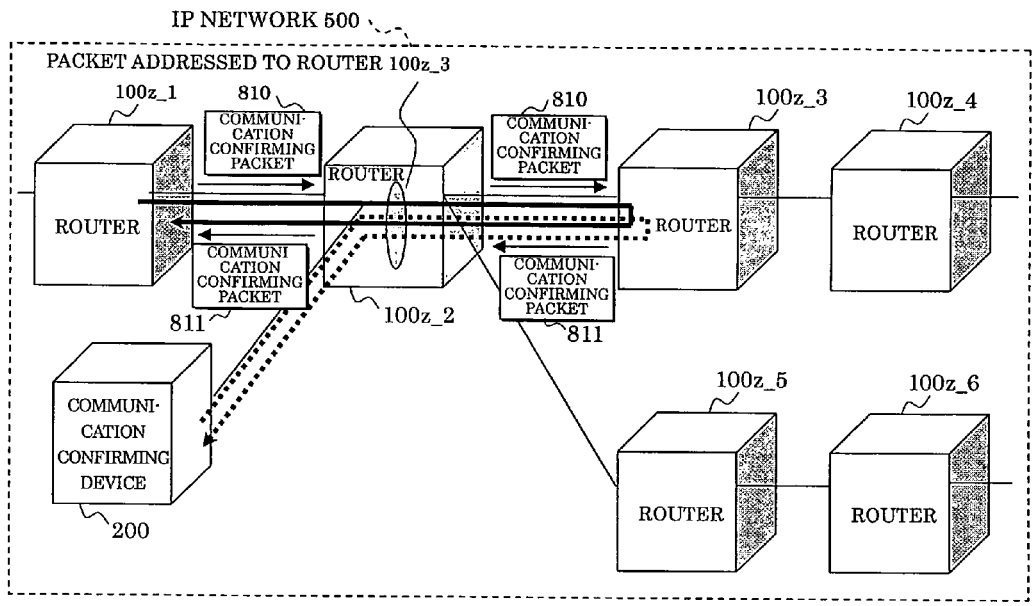
FIGS. 11A and 11B are block diagrams showing a network composed of general routers.
Figure 11B:
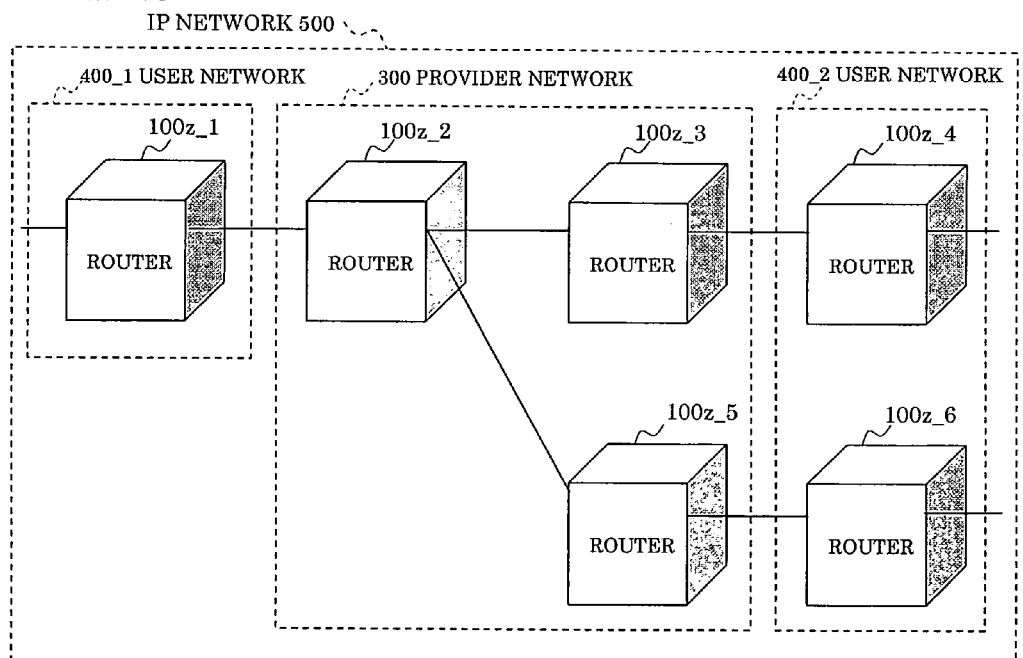

FIG. 10 shows the embodiment (6) of the router 100 according to the present invention. This embodiment (6) shows the embodiment of the routers 100_1-100_3 in the IP network 500 shown in FIG. 9.

Namely, the embodiment (6) includes the VPN network structured within the user network 400_1, the provider network 300, and the user network 400_2.

The router 100 is different from that of the embodiment (5) shown in FIG. 8 in that the path extractor 62, the output port deciding portion 11, the arrival confirming portion 41, the relay confirming portion 42, and the network monitor 61 are added.

In the embodiment (6), monitoring of the VPN network 600 is performed by using all of the edge routers 100_1-100_3 (hereinafter, occasionally represented by a reference numeral 100) configuring the provider network 300. The monitoring operation procedure of the edge router 100 will now be described.

Each of the network monitors 61 of the edge routers 100_1-100_3 periodically starts up the overall-path tester 60, and starts the confirmation of the communicating state of the entire network. The overall-path tester 60 extracts the overall-accommodating path information including the local path by the path extractor 62 and the local path extractor 63, and provides the communication confirming request including each accommodating path information to the communication confirming packet generator 10.

The communication confirming packet generator 10 generates the communication confirming packet 800 matching each path information from the output port deciding portion 11, the hop number setter 12, and the output VPN port deciding portion 13 every time the communication confirming request is received and provides the communication confirming packet 800 to the packet transmitter 20_1. The packet transmitter 20_1 transmits the communication confirming packet 800 from the designated output port.

The transmission operation of the communication confirming packet 800 hereafter is the same as that of the embodiment (4) or (5).

In the router 100, the packet receiver 30_1 receives the response packet 801 or the completion notifying packet 802 corresponding to each communication confirming packet 800 to be provided to the communication confirming packet determining portion 40. The communication confirming packet determining portion 40 determines the communicating state based on the processing results of the arrival confirming portion 41, the relay confirming portion 42, and the VPN communication confirming portion 43.

In all of the edge routers 100_1-100_3, the communication confirming packet determining portion 40 notifies the determination results to the result output portion 50, which outputs the determination results to the monitor server 64 or the like by e.g. an MIB (Management Information Base) or the like.

Thus, it becomes possible for the monitoring server 64 to monitor the communicating state of the entire network based on the result of the communication confirmation.

Namely, the monitoring server 64 performs a fault detection or the like based on the information of the communicating state collected from all of the edge routers 100, thereby enabling an early stage support such as a fault detour, a fault recovery, a system switchover, and improving the reliability of the network.

What is claimed is:

1. A router comprising:
   a communication confirming packet generator generating a communication confirming packet addressed to a destination router;
   an output port deciding portion deciding an output port different from a normal output port indicated as an output port corresponding to the destination router of the communication confirming packet by a routing table;
   a packet transmitter transmitting the communication confirming packet through the decided output port; and
   a communication confirming packet determining portion determining a communicating state of a relay function of its own router and an arrival state of a path based on a response packet for the communication confirming packet received from the destination router of the communication confirming packet returned from another router connected to the output port and relayed by its own router.

2. The router as claimed in claim 1, wherein the communication confirming packet generator generates the communication confirming packet set to head for the destination router through its own router.

3. The router as claimed in claim 1, wherein the communication confirming packet further includes a transfer hop number, the router further comprising:
   a hop number setter setting the transfer hop number to a predetermined value,
   the communication confirming packet determining portion determining the communicating state of the relay function based on a completion notifying packet returned when a difference between the transfer hop number and the predetermined value is null, or on an absence of a completion notifying packet returned.

4. The router as claimed in claim 1, wherein the communication confirming packet generator generates the communication confirming packet having a VPN local address as a destination,
   the router further comprising:
   an output VPN port deciding portion deciding an output port corresponding to a VPN different from an output port corresponding to the VPN local address of the destination of the communication confirming packet given by a VPN management table and the routing table.

5. The router as claimed in claim 1, further comprising a path extractor extracting overall-path information which confirms a communication based on the routing table to be provided to the communication confirming packet generator,
   the communication confirming packet generator generating a communication confirming packet based on the overall-path information extracted.

6. The router as claimed in claim 4, further comprising a local path extractor extracting overall-VPN local path information which confirms a communication based on the routing table and the VPN management table to be provided to the communication confirming packet generator,
   the communication confirming packet generator generating a communication confirming packet based on the VPN local path information extracted.

7. The router as claimed in claim 5, further comprising a network monitor instructing the path extractor to extract overall-path information per a predetermined time interval.

8. The router as claimed in claim 6, further comprising a network monitor instructing the local path extractor to extract overall-VPN local path information per a predetermined time interval.

9. A router comprising:
   a communication confirming packet generator generating a communication confirming packet set to head for a destination router through its own router;
   a packet transmitter transmitting the communication confirming packet to an output port decided based on a routing table or a VPN management table; and
   a communication confirming packet determining portion determining a communicating state of a relay function of its own router and an arrival state of a path based on a response packet for a completion notifying packet received from the destination router for the communication confirming packet returned from another router connected to the output port and relayed by its own router.

* * * * *